US012580207B2

(12) United States Patent
Berner et al.

(10) Patent No.: US 12,580,207 B2
(45) Date of Patent: Mar. 17, 2026

(54) DISTRIBUTOR PLATE FOR AN ELECTROCHEMICAL CELL, AND ELECTROCHEMICAL CELL

(71) Applicant: Robert Bosch GmbH, Stuttgart (DE)

(72) Inventors: Ulrich Berner, Stuttgart (DE); Manuel Schneiter, Boeblingen (DE)

(73) Assignee: Robert Bosch GmbH, Stuttgart (DE)

( * ) Notice: Subject to any disclaimer, the term of this patent is extended or adjusted under 35 U.S.C. 154(b) by 537 days.

(21) Appl. No.: 18/250,850

(22) PCT Filed: Oct. 6, 2021

(86) PCT No.: PCT/EP2021/077529
§ 371 (c)(1),
(2) Date: Apr. 27, 2023

(87) PCT Pub. No.: WO2022/089898
PCT Pub. Date: May 5, 2022

(65) Prior Publication Data
US 2024/0006626 A1     Jan. 4, 2024

(30) Foreign Application Priority Data
Oct. 29, 2020     (DE) ..................... 10 2020 213 580.0

(51) Int. Cl.
*H01M 8/026*          (2016.01)
*H01M 8/04119*      (2016.01)
(52) U.S. Cl.
CPC ....... *H01M 8/026* (2013.01); *H01M 8/04156* (2013.01)

(58) Field of Classification Search
CPC . H01M 8/026; H01M 8/04156; H01M 8/0258
See application file for complete search history.

(56) References Cited

U.S. PATENT DOCUMENTS

2004/0067405 A1*   4/2004   Turpin ................ H01M 8/0263
                                                                     429/479
2006/0216553 A1     9/2006   Lee et al.
                          (Continued)

FOREIGN PATENT DOCUMENTS

CN       109065907 A      12/2018
CN       109921057 A       6/2019
                          (Continued)

OTHER PUBLICATIONS

Translation of International Search Report for Application No. PCT/EP2021/077529 dated Jan. 31, 2022 (2 pages).

*Primary Examiner* — Stewart A Fraser
(74) *Attorney, Agent, or Firm* — Michael Best & Friedrich LLP

(57) ABSTRACT
The invention relates to a distributor plate (7) for an electrochemical cell (1), wherein the distributor plate (7) has a structure comprising webs (12) with surfaces (13) and main channels (11) with base surfaces (33), and the surfaces (13) of the webs (12) have distributor channels (60), wherein at least one distributor channel (60) has an auxiliary channel (15) which connects the at least one distributor channel (60) to a base surface (33) of a main channel (11) and/or a lateral surface (31) of a web (12), and wherein the auxiliary channel (15) has a smaller diameter than the at least one distributor channel (60). The invention additionally relates to an electrochemical cell (1).

14 Claims, 9 Drawing Sheets

(56)          References Cited

U.S. PATENT DOCUMENTS

| | | | |
|---|---|---|---|
| 2009/0130501 A1* | 5/2009 | Wieland | H01M 8/0618 |
| | | | 429/415 |
| 2017/0054156 A1 | 2/2017 | Kawajiri et al. | |
| 2018/0261854 A1* | 9/2018 | Schrooten | H01M 8/2418 |
| 2021/0111415 A1* | 4/2021 | Ohnishi | H01M 8/2432 |
| 2024/0006627 A1* | 1/2024 | Eifert | H01M 8/026 |

FOREIGN PATENT DOCUMENTS

| | | | |
|---|---|---|---|
| CN | 110783596 A | 2/2020 |
| DE | 102008030522 A1 | 2/2009 |
| EP | 2876715 A1 | 5/2015 |
| JP | 2007115525 A | 5/2007 |
| JP | 2014216231 A | 11/2014 |
| JP | 2017079145 A | 4/2017 |
| JP | 2020047440 A | 3/2020 |
| JP | 2020047441 A | 3/2020 |
| JP | 2020047443 A | 3/2020 |
| WO | 2014013747 A1 | 1/2014 |

* cited by examiner

DISTRIBUTOR PLATE FOR AN ELECTROCHEMICAL CELL, AND ELECTROCHEMICAL CELL

BACKGROUND

The invention relates to a distributor plate for an electrochemical cell, wherein the distributor plate has a structure comprising webs with surfaces and main channels having floor surfaces, and the surfaces of the webs have distributor channels. Furthermore, the invention relates to an electrochemical cell.

Electrochemical cells are electrochemical energy transducers and are known in the form of fuel cells or electrolyzers.

A fuel cell converts the chemical reaction energy of a continuously supplied fuel and an oxidizing agent into electrical energy. In known fuel cells, in particular hydrogen ($H_2$) and oxygen ($O_2$) are converted to water ($H_2O$), electrical energy, and heat.

Among others, proton-exchange membrane (PEM) fuel cells are known. Proton-exchange membrane fuel cells comprise a centrally arranged membrane that is permeable to protons, i.e. hydrogen ions. The oxidizing agent, in particular atmospheric oxygen, is thereby spatially separated from the fuel, in particular hydrogen.

Fuel cells comprise an anode and a cathode. The fuel is supplied to the fuel cell at the anode and catalytically oxidized with loss of electrons to form protons that reach the cathode. The lost electrons are discharged from the fuel cell and flow via an external circuit to the cathode.

The oxidizing agent, in particular atmospheric oxygen, is supplied to the fuel cell at the cathode and reacts to form water by receiving the electrons from the external circuit and protons. The resulting water is drained from the fuel cell. The gross reaction is:

$$O_2 + 4H^+ + 4e'^- \rightarrow 2H_2O$$

A voltage is applied between the anode and the cathode of the fuel cell. In order to increase the voltage, multiple fuel cells can be mechanically arranged one behind the other to form a fuel cell stack, which can also be referred to as a fuel cell setup, and can be electrically connected in series.

A stack of electrochemical cells typically has end plates that press the individual cells together and impart stability to the stack. The end plates can also serve as a positive or negative pole of the stack for discharging the current.

The electrodes, i.e. the anode and the cathode, and the membrane can be structurally assembled to form a membrane-electrode assembly (MEA).

Stacks of electrochemical cells further have bipolar plates, also referred to as gas distributor plates or distributor plates. Bipolar plates serve to distribute the fuel evenly to the anode and to distribute the oxidizing agent evenly to the cathode. Furthermore, bipolar plates usually have a surface structure, in particular channel-like structures, for distributing the fuel and the oxidizing agent to the electrodes. In particular in fuel cells, the channel-like structures also serve to drain the water produced during the reaction. In addition, the bipolar plates can comprise structures for passing a cooling medium through the electrochemical cell in order to discharge heat.

In addition to the media guidance with respect to oxygen, hydrogen, and water, the bipolar plates ensure a planar electrical contact to the membrane.

For example, a fuel cell stack typically comprises up to a few hundred individual fuel cells stacked one on top of the other in layers as so-called sandwiches. The individual fuel cells comprise one MEA as well as in each case one bipolar plate half on the anode side and on the cathode side. In particular, a fuel cell comprises an anode monopolar plate and a cathode monopolar plate, typically in each case in the form of embossed sheets, which together form the bipolar plate and thus form channels for guiding gas and liquids, between which the cooling medium flows.

Furthermore, electrochemical cells typically comprise gas diffusion layers for gas distribution. The gas diffusion layers are arranged between a bipolar plate and a MEA and are typically constructed on the channel side, i.e. in the direction of the adjacent bipolar plate, from a carbon fiber nonwoven fabric, which is also referred to as "gas diffusion backing" (GDB), and on the catalyst side, i.e. in the direction of the membrane, from a microporous layer, which is also referred to as "micro porous layer" (MPL).

By contrast to a fuel cell, an electrolyzer is an energy converter, which, while applying electrical voltage, preferably splits water into hydrogen and oxygen. Electrolyzers also have MEAS, bipolar plates, and gas diffusion layers, among other things.

For the efficiency of an electrochemical cell, in particular with a polymer electrolyte membrane, it is particularly important to homogeneously supply reaction gas to the electrode layers arranged on the membrane.

Known distributor plates in particular have channels and respectively abutting or adjacent webs that form a structure. The channels are also referred to as main channels or channels and the webs can be called lands. Surfaces of the webs that are at least partially parallel to the extension plane of the distributor plate comprise contact surfaces of the distributor plate to an adjacent gas diffusion layer of the electrochemical cell. The gases hydrogen and oxygen pass the gas diffusion layer from the channels of the distributor plate to the reaction zone on the membrane. The regions of the gas diffusion layer, which rest on the webs of the distributor plate and thus the corresponding regions of the underlying MEA, are supplied comparatively poorly with reaction gas, in particular under flooding conditions of the electrochemical cell, which can lead to an undesirable inhomogeneous current density distribution.

On the side of the membrane at which air, i.e. oxygen, is supplied, water is produced in the operation of the fuel cell, which must be transported through the gas diffusion layer to the channels of the distributor plate and removed from the cell there. Typical operating temperatures for electrochemical cells having a membrane are less than 120° C., so that the water typically condenses in the gas diffusion layer and is present in liquid form. In the gas diffusion layer, the transport direction of the water is opposite to the transport direction of the gas, and accumulated water can severely impede the feeding of reaction gas, in particular oxygen.

The higher the power density of the electrochemical cell, the more water is produced, so that the discharge of the amounts of liquid water in the contact region between gas diffusion layer and air channel side of the distributor plates can be insufficient.

JP 2020-47441 A describes an improved drainage system for bipolar plates in which additional flutes are provided in flanks of the webs parallel to the direction of the main channels.

JP 2020-47443 A describes bipolar plates with improved water drainage, wherein webs of the bipolar plates have an additional channel system arranged transversely to the direction of the main channels. Each of two channels of the additional channel system has a common drain. Furthermore, transverse structures in main channels of a distributor plate, leading to high pressure loss, are disclosed.

JP 2020-47440 A also relates to bipolar plates with an improved drainage system, wherein the webs have notches transverse to the direction of the main channels and additional flutes along the flanks of the webs parallel to the direction of the main channels.

The channels described in these documents serve to discharge water due to their dimensions and are not designed for a gas transport that would improve the supply of oxygen among the webs.

SUMMARY

A distributor plate for an electrochemical cell is proposed, wherein the distributor plate has a structure comprising webs with surfaces and main channels with base surfaces, and the surfaces of the webs have distributor channels, wherein at least one distributor channel, in particular of the aforementioned distributor channels, has an auxiliary channel which in particular fluidically connects the at least one distributor channel to a base surface of an in particular adjacent main channel and/or a lateral surface of a web, and wherein the auxiliary channel has a smaller diameter, preferably a smaller width and/or depth, in particular a smaller cross-sectional surface area, than the at least one distributor channel. Furthermore, an electrochemical cell comprising the distributor plate is proposed.

Preferably, the electrochemical cell, which is preferably a fuel cell or an electrolyzer, preferably comprises at least one distributor plate, at least one gas diffusion layer, and at least one membrane or membrane-electrode arrangement. In particular, a respective gas diffusion layer is arranged between a distributor plate and a membrane.

The gas diffusion layer preferably has a porous structure and further preferably abuts the distributor plate under a high pressure of approximately 10 to 15 bar. Preferably, the membrane is a polymer-electrolyte membrane having, for example, perfluorosulfonic acid (PFSA), in particular nafion, or consists of perfluorosulfonic acid (PFSA), in particular nafion. Furthermore, alkaline membranes can also be used.

Preferably, the gas diffusion layer comprises a nonwoven fabric, in particular a carbon fiber nonwoven fabric, and optionally a microporous layer, wherein the nonwoven fabric is arranged on a side of the gas diffusion layer facing the distributor plate. Further preferably, the gas diffusion layer consists of the carbon fiber nonwoven fabric and optionally the microporous layer. In the nonwoven fabric, the gas permeability in the thickness direction, i.e. in the direction of the membrane, can be comparable to the gas permeability in the plane, i.e. in directions parallel to the membrane.

The distributor plate preferably comprises carbon such as graphite, a metal such as stainless steel or titanium, and/or an alloy containing the metal. Further preferably, the distributor plate is constructed of carbon, metal, and/or alloy. In particular, a base plate of the distributor plate is made of carbon, the metal, and/or the alloy.

The distributor channels primarily serve to supply gas to the gas diffusion layer under the webs of the bipolar plate and thus the electrode connected thereto, in particular oxygen. The distributor channels guide the gas in particular to the regions where the gas diffusion layer rests on the webs. The at least one distributor channel preferably connects two, in particular two adjacent, main channels. By contrast, the auxiliary channel carries primarily created liquid reaction water from the webs into the in particular adjacent main channel. Preferably, more than one distributor channel comprises an auxiliary channel. Further preferably, there is one auxiliary channel per distributor channel. The auxiliary channel can also be referred to as a drainage channel, capillary channel, groove, or a microscopically small, groove-like structure.

The at least one distributor channel and the auxiliary channel are in particular arranged on one side of the distributor plate, which faces in the direction of an adjacently arranged gas diffusion layer in the electrochemical cell.

The distributor plate, which can also be referred to as a bipolar plate, preferably has a wave-like structure, wherein webs and main channels alternate and are further preferably arranged parallel to one another.

Preferably, the surfaces of the webs comprise in each case at least one contact region, which can also be referred to as a contact surface and abuts against the adjacently arranged gas diffusion layer. Preferably, the contact regions of the webs are arranged substantially parallel to the floor surfaces of the main channels. Here, "substantially parallel" is to be understood in that a plane in which the contact regions lie and the floor surfaces enclose an angle of less than 30°, further preferably less than 20°, more preferably less than 10°, and in particular less than 5°.

The porous structure of the gas diffusion layers makes it difficult to naturally drain the water, which is typically present in liquid form at high current densities, so that water back-up can occur. This can limit the power density of the electrochemical cell in the contact regions.

Preferably, the webs have lateral surfaces, which are in particular enclosed by the surface of the webs. The surface of the webs further preferably comprises two lateral surfaces per web, each connecting to a floor surface of the adjacent main channel. The lateral surfaces can also be referred to as flanks and are preferably arranged at a flank angle in relation to the floor surfaces, wherein the flank angle is further preferably in a range from 90° to 135°, more preferably in a range from 90° to 125°, particularly preferably from 95° to 110°. Furthermore, the lateral surfaces are preferably arranged at an angle to the contact regions. Preferably, the base surfaces are at least partially planar.

The main channels are preferably arranged straight and further preferably parallel to one another on the distributor plate.

The auxiliary channel has a cross-sectional surface area, which is preferably triangular, i.e. V-shaped, round, square, or polygonal. Further preferably, the cross-sectional surface area of the auxiliary channel is V-shaped. The cross-sectional surface area of the auxiliary channel can be constant over a length of the auxiliary channel, or it can change in size and/or geometry. Preferably, a respective width and/or a depth of the auxiliary channel, in particular in a first part, is from 1 μm to 150 μm, further preferably from 1 μm to 100 μm, particularly preferably from 1 μm to 50 μm, more preferably from 1 μm to 10 μm, and most preferably 1 μm to 6 μm.

Preferably, the gas diffusion layer arranged adjacent to the distributor plate comprises fibers, and further preferably the width of the auxiliary channel is less than a fiber diameter of the gas diffusion layer, for example about 8 The width of the auxiliary channel can also be greater than the fiber diameter of the gas diffusion layer. In particular the width, but also the depth, of the auxiliary channel can be selected depending on a structure of the adjacent gas diffusion layer.

Furthermore, preferably the diameter, in particular the depth and/or the width, of the auxiliary channel are selected such that the auxiliary channel forms a capillary effect, in particular with regard to water. Here, the "diameter" is in particular understood to mean the largest diameter of the cross-sectional surface area.

The distributor channels have a cross-sectional surface area, which is preferably rectangular, triangular, or U-shaped. Preferably, a cross-sectional surface area of the main channels is greater by at least a factor of fifty than a cross-sectional surface area of the at least one distributor channel. Preferably, a distributor channel width and/or a distributor channel depth are each from 10 μm to 400 μm, further preferably the distributor channel width and/or the distributor channel depth are each greater than 50 μm and in particular a maximum of 150 μm.

The distributor channels can be arranged, for example, in an undulating, parallel, cross-shaped, trapezoidal, or honeycomb manner in relation to one another. Preferably, the distributor channels enclose a distributor angle of 20° to 70° with the main channel, further preferably 30° to 60°, in particular 30° to 45°.

Preferably, the distributor plate at least partially has a coating. The coating can be more hydrophilic or more hydrophobic than a material of the base plate of the distributor plate.

The coating can be hydrophobic and, in particular, it can have a lotus effect. Here, "hydrophobic" is preferably understood to mean that the wettability is poorer than the wettability of smooth-surface steel with water, more preferably that the contact angle with respect to water droplets is greater than 70°, in particular greater than 80°. The coating can in particular be present in the contact regions in order to lower the contact resistance here, for example. Furthermore, the coating can be present on the floor surfaces. Furthermore, the coating can only be present within or exclusively outside the auxiliary channels.

Preferably, the coating comprises carbon, such as soot or graphite, in particular carbon particles, and an in particular organic binder, for example resin and/or polyvinylidene fluoride (PVDF). The binder can be thermoplastic or thermosetting. The coating preferably has a layer thickness in a range from 1 nm to 200 μm, further preferably from 5 nm to 100 μm, particularly preferably from 5 nm to 50 μm. In the contact regions of the webs, a layer thickness of greater than 5 μm is preferably present. The layer thickness is preferably less than 1 μm on the lateral surfaces and the floor surfaces.

Furthermore, the distributor plate can optionally at least partially comprise a coating having an inner structure. The auxiliary channel can be formed by the inner structure of the coating. Preferably, the internal structure is hydrophilic so that water is drawn into the internal structure, like into a wick. Here, "hydrophilic" is preferably understood to mean that the wettability is better than the wettability of smooth-surface steel with water, more preferably that the contact angle with respect to water droplets is less than 40°, in particular less than 10°. The coating can comprise a hydrophilic component, for example, oxidized carbon particles having hydroxide, carbonyl, and/or carboxyl groups, with a polymeric binder, which is particularly applicable for carbon distributor plates. Furthermore, hydrophilic surface properties can be produced, for example, by a surface treatment with, for example, oxygen or acid. Preferably, the coating has a surface roughness Ra in a range from 0.1 to 10 μm, and further preferably a bulk peak-to-valley maximum distance of 0.1 μm to 20 μm, more preferably from 1 μm to 10 μm.

The coating can be applied, for example, by laser sintering or by methods also used in order to apply a metal, ceramic, polymer, or mixtures thereof to the distributor plate in motifs. A further example of a coating method is the spray coating.

Alternatively, a coating material, such as powder, could first be applied to the distributor plate, then it could be removed from the contact regions, and then a selective (laser) sintering method could be performed. Thus, for example, only the main channels could be provided with the coating comprising the inner structure. The coating can occur selectively, for example, through a mask and/or screen printing.

The coating can also be applied over a surface and subsequently removed in part, for example by laser methods or mechanical methods, so that the auxiliary channel is exposed and in particular lateral walls of the auxiliary channel are formed by the coating.

The distributor channels and/or the auxiliary channel can be introduced into the base plate of the distributor plate, which is in particular a sheet metal, and/or into the coating of the distributor plate. In the latter case, the layer thickness is preferably greater than 5 μm. The distributor channels and/or the auxiliary channel can be coated or uncoated.

In a first preferred embodiment, the auxiliary channel terminates on a planar portion of the base surface of the main channel or the lateral surface of the web, or on an edge between the base surface of the main channel and the lateral surface of the web. Further preferably, the auxiliary channel terminates abruptly at a terminal, i.e. at a portion with a constant width and depth. Alternatively, the width and/or depth of the auxiliary channel can decrease towards the end point. The term "abrupt" is understood in particular to mean that there is no opening into a further auxiliary channel or branching into multiple channels at the end point.

In a second preferred embodiment, the auxiliary channel opens into a further auxiliary channel on the base surface of the main channel. Preferably, the further auxiliary channel is arranged exclusively on the base surface. The further auxiliary channel can be arranged along an edge between the lateral surface and the base surface, wherein the further auxiliary channel is in particular bounded on a first side by the lateral surface. The edge on which the lateral surface and the base surface meet can also be referred to as the cutting edge or cutting line. Furthermore, the further auxiliary channel can be arranged along an axis of symmetry of the main channel, wherein the further auxiliary channel can have the same distance from both adjacent lateral surfaces. This can also be described by stating that the further auxiliary channel runs centrally in the main channel. Preferably, the further auxiliary channel is arranged at an assembly angle of less than 45° to the main channel. For each main channel, a further auxiliary channel can be present or multiple further auxiliary channels can be present, into which at least one auxiliary channel respectively opens from the webs.

In a third preferred embodiment, the auxiliary channel opens up into an end structure, wherein the auxiliary channel in the end structure branches out into at least two subchannels and the at least two sub-channels each have a smaller diameter than the auxiliary channel. In particular, a respective size of the cross-sectional surface area of the at least two sub-channels is smaller than a size of the cross-sectional surface area of the auxiliary channel. The end structure can also be referred to as a finer structure or extension, effectively increasing the surface area of the liquid water so that removal and/or vaporization of the liquid water into a gas phase conducted in the main channel can be improved. Further preferably, the end structure has at least three sub-channels, wherein at least one sub-channel can branch into further, at least two further, sub-channels. Preferably, the auxiliary channel and at least one of the sub-channels partially enclose an angle in a range from 20° to 70°, more preferably 30° to 60°, for example 45°. Furthermore, the two sub-channels preferably terminate in an orientation substantially parallel to the auxiliary channel. Preferably, the sub-channels have a straight path between respective branch lines.

Preferably, the auxiliary channel is arranged with a first part at a first angle in a range from 30° to 150° in relation to the main channel and is arranged with a second part at a second angle in a range of less than 45° in relation to the main channel.

Further preferably, the first part of the auxiliary channel, which is in particular located directly on and/or in the at least one distributor channel, is arranged substantially orthogonally to the main channel. By "substantially orthogonal," it is understood that the first angle is 60° to 120°, further preferably 80° to 100°, and more preferably 85° to 95°.

Further preferably, the second part of the auxiliary channel is arranged substantially parallel to the main channel. By "substantially parallel," it is understood that the second angle is less than 30°, preferably less than 20°, more preferably less than 10°, and particularly preferably less than 5°. Due to the arrangement of the second part of the auxiliary channel in the second angle, the auxiliary channel is aligned in a main flow direction from the gas phase in the main channel.

Preferably, the auxiliary channel has a curved path, which can also be referred to as a circular path and which in particular connects the first part of the auxiliary channel to the second part of the auxiliary channel. Alternatively or additionally, the auxiliary channel can have a straight path with at least one, preferably more than one, change of direction, which can also be referred to as a kink. The first part and/or the second part can also each have a curved path.

There can also be more than two parts of the auxiliary channel, so that more than two angles relative to the main channel can be adjusted.

The fact that the at least one distributor channel comprises an auxiliary channel is understood in particular to mean that the auxiliary channel forms at least one continuation of the distributor channel. The auxiliary channel can begin, in particular directly, at or in the at least one distributor channel. Preferably, the auxiliary channel runs partially in the at least one distributor channel or within the at least one distributor channel. This can also be described by stating that the auxiliary channel and the at least one distributor channel overlap. The auxiliary channel can also be on an overall length of the at least one distributor channel. The at least one distributor channel preferably comprises a base in which the auxiliary channel is partially arranged. The diameter of the auxiliary channel can be constant in the at least one distributor channel or can increase in the direction of the main channel.

The lateral surface of the web can comprise at least one blocking edge, wherein the auxiliary channel is preferably arranged at least partially along the at least one blocking edge. For example, multiple blocking edges can form offset protrusions that can be embossed into the distributor plate. The at least one blocking edge leads to an increased flow of the gas phase from the main channel into the distributor channels. In particular, the at least one blocking edge is arranged flush at an entrance into the at least one distributor channel.

The features of the described embodiments are freely combinable with one another.

The distributor plate according to the invention improves both the gas supply of the gas diffusion layer at the contact regions, i.e. the penetration of oxygen in particular into the regions below the webs, and the water discharge from the contact regions into the main channels of the distributor plate.

Through the distributor channels, the gas inflow into the contact regions is improved, and the auxiliary channels provide a good drainage of liquid water from the distributor channels. The gas supply can be further improved by specific geometries of the distributor channels. The small diameter of the auxiliary channels results in a capillary effect that further assists in the removal of the water.

Through the further auxiliary channel in the main channel, the drainage within the main channels is also further optimized.

In addition, due to the possibly existing end structures, finer structures exist that effectively enlarge the surface area of the liquid water, thereby improving a removal and vaporization into the gas phase within the main channels.

The blocking edges that provide for a gas deflection from the main channels into the distributor channels can also contribute to draining the contact regions with the auxiliary channels along the blocking edges.

Furthermore, liquid water can be drawn into the inner structure of the optionally present coating and can be transported to the main channels.

BRIEF DESCRIPTION OF THE DRAWINGS

Embodiments of the invention are explained in more detail with reference to the drawings and the following description.

The drawings show.

DETAILED DESCRIPTION

In the following description of the embodiments of the invention, identical or similar elements are denoted by identical reference numbers, wherein a repeated description of these elements is omitted in individual cases. The figures show the subject-matter of the invention only schematically.

Figure 1:
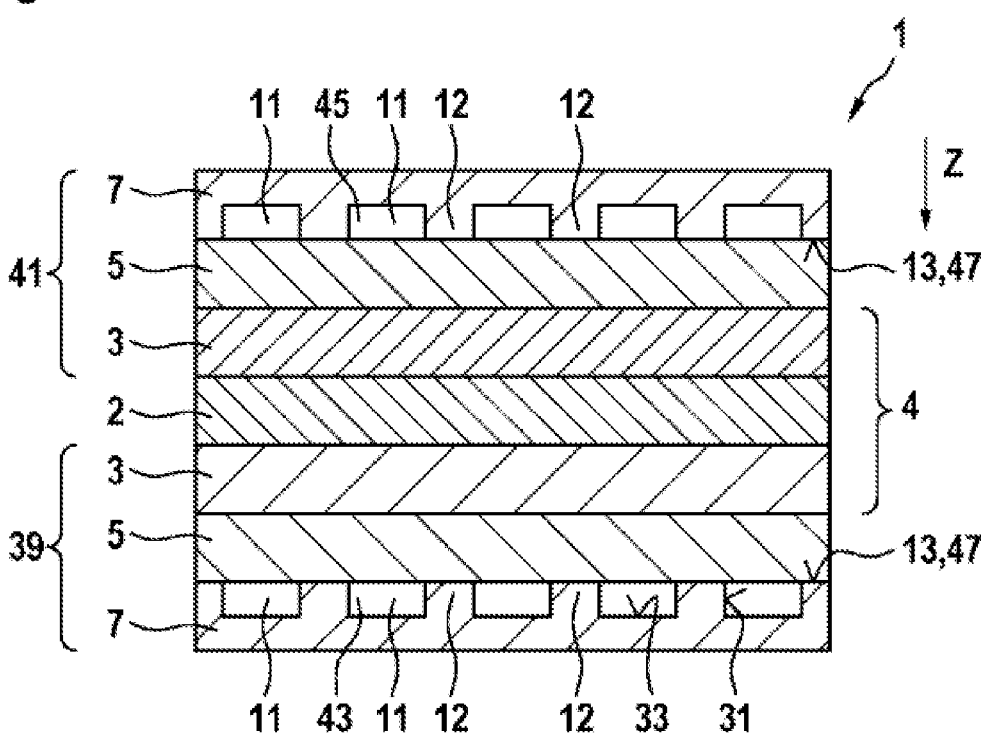
FIG. 1 a schematic illustration of an electrochemical cell according to the prior art, FIG. 2 a fuel cell stack setup with distributor plates, FIG. 3 a contact region between a gas diffusion layer and a distributor plate, FIG. 4 a section of a distributor plate with distributor channels, FIG. 5 a section of a distributor plate with distributor channels and auxiliary channels, FIG. 6 a sectional view along a first sectional plane, FIG. 7 a section of a distributor plate with auxiliary channels within distributor channels, FIG. 8 a sectional view along a second sectional plane, FIG. 9 a sectional view along a third sectional plane, FIG. 10 a section of a distributor plate with auxiliary channels and an end structure, FIG. 11 a further embodiment of an end structure, FIG. 12 yet another embodiment of an end structure, FIG. 13 a section of a distributor plate with auxiliary channels and further auxiliary channels, FIG. 14 a section of a distributor plate with blocking edges, FIG. 15 a section of a distributor plate with blocking edges and auxiliary channels, FIG. 16 a further sectional view along the second sectional plane, FIG. 17 a further sectional view along the first sectional plane, and FIG. 18 a section of a distributor plate with blocking edges, auxiliary channels, and a further auxiliary channel.

FIG. 1 schematically shows an electrochemical cell 1 in the form of a fuel cell according to the prior art. The electrochemical cell 1 has a membrane 2 as electrolytes. The membrane 2 separates a cathode space 39 from an anode space 41.

A respective electrode layer 3, a gas diffusion layer 5, and a distributor plate 7 are arranged on the membrane 2 in the cathode space 39 and anode space 41. The connection of the membrane 2 and the electrode layer 3 can also be referred to as a membrane-electrode assembly 4.

The distributor plates 7 have main channels 11 for gas supply, for example of oxygen 43 in the cathode space 39 and hydrogen 45 in the anode space 41, to the gas diffusion layers 5. Main channels 11 and webs 12 alternate on the distributor plates 7.

On a surface 13 of the webs 12, a respective contact region 47 is formed between the distributor plate 7 and the adjacently arranged gas diffusion layer 5. Furthermore, the webs 12 have lateral surfaces 31 and the main channels 11 have floor surfaces 33.

Figure 2:
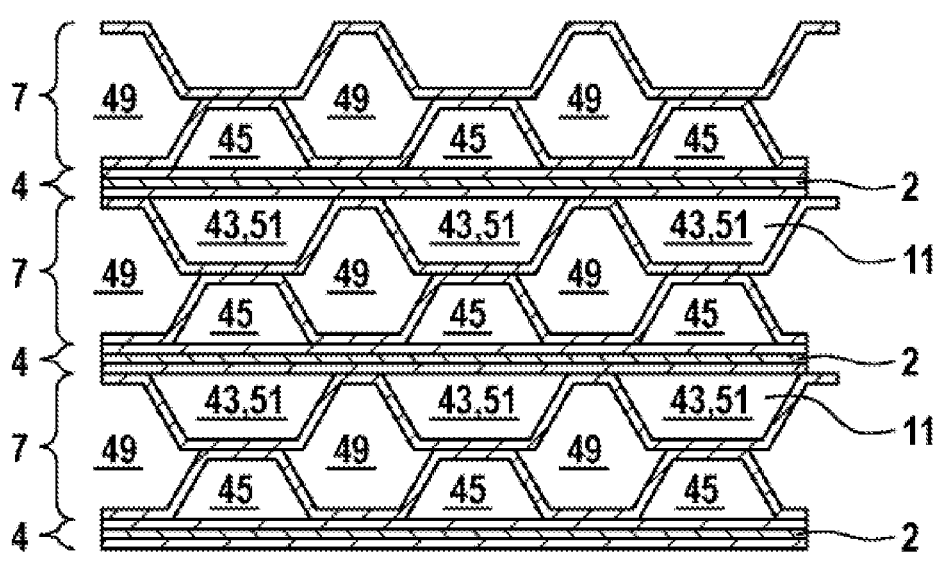

FIG. 2 shows a fuel cell setup comprising multiple distributor plates 7 and membrane electrode assemblies 4 comprising membranes 2. Oxygen 43, or air in which oxygen 43 is contained, and hydrogen 45 are conducted to the membrane-electrode assemblies 4 through the distributor plates 7. Water 51 is discharged in the main channels 11 of the distributor plates 7 in which oxygen 43, or air in which oxygen 43 is contained, is supplied. In addition, the distributor plates 7 serve to guide a coolant 49.

Figures 3, 4:
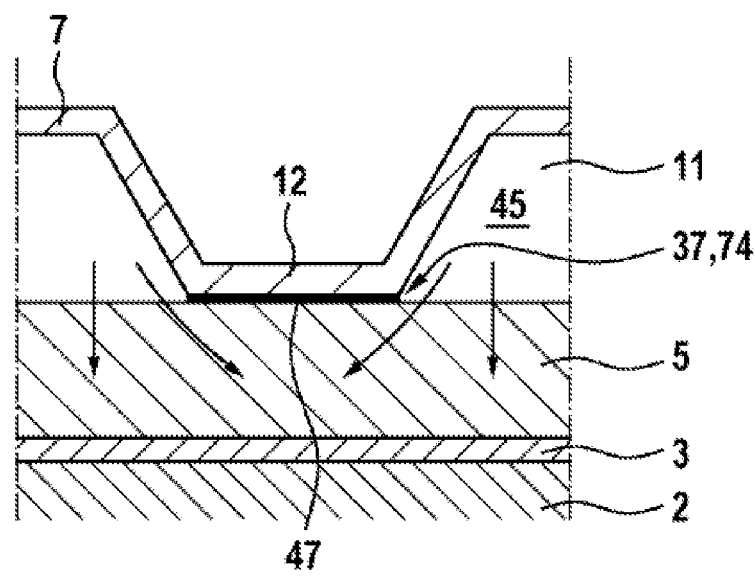

FIG. 3 shows a contact region 47 between a gas diffusion layer 5 and a distributor plate 7. A web 12 of the distributor plate 7 is in contact with the gas diffusion layer 5 here. Furthermore, a coating 37 with an inner structure 74 is arranged on the web 12 of the distributor plate 7. Hydrogen 45 passes from the main channels 11 through the gas diffusion layer 5 to the electrode layer 3, which is arranged on the membrane 2.

FIG. 4 shows a top perspective view of a section of a distributor plate 7, which comprises main channels 11 and webs 12 in alternation. A main current direction 53 is present along the main channels 11. Relative to the orientation of the main channels 11, an assembly angle 72 is designated. Furthermore, the main channels 11 have a respective axis of symmetry 55.

The webs 12 have a respective surface 13, of which the parts arranged at an angle to the floor surfaces 33 of the main channels 11 are referred to as lateral surfaces 31. Distributor channels 60 are arranged in the contact region 47 of the surface 13 of the webs 12. The floor surfaces 33 of the main channels 11 connect to the lateral surfaces 31 of the webs 12.

Figure 5:
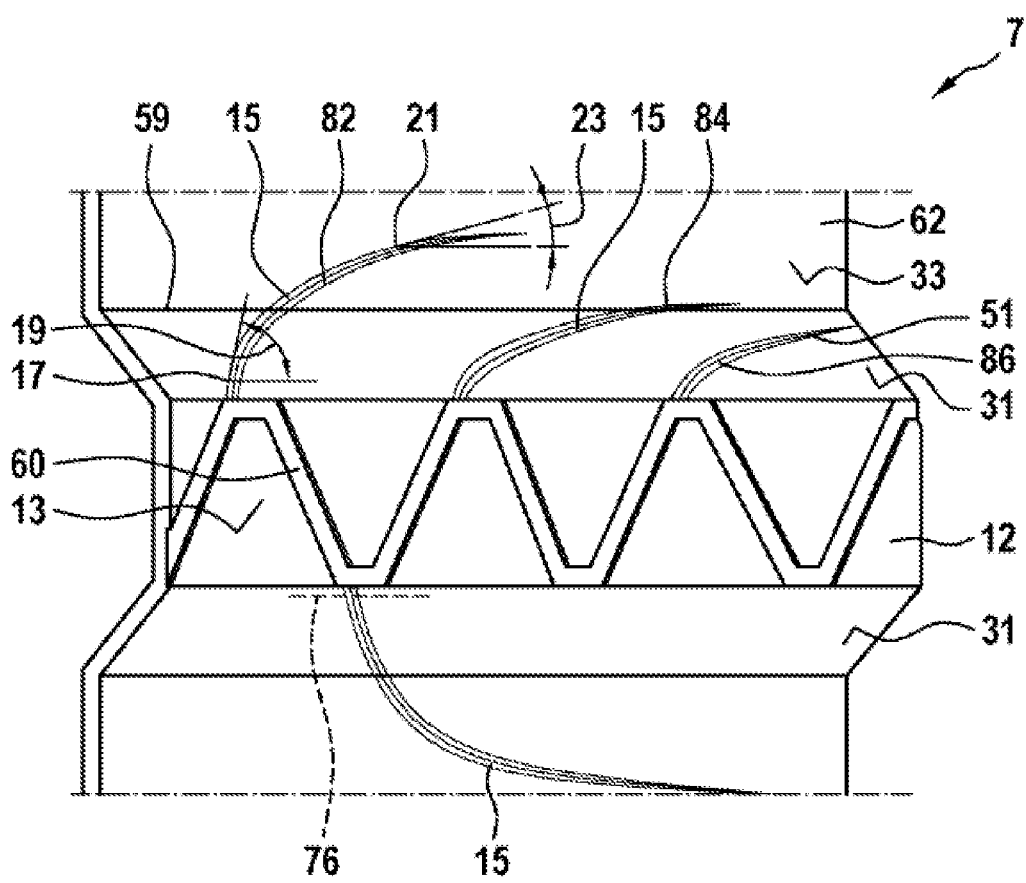

FIG. 5 shows a top perspective view of a section of a distributor plate 7 with distributor channels 60 and auxiliary channels 15. The distributor plate 7 according to FIG. 5 substantially corresponds to the distributor plate 7 according to FIG. 4 with the difference that a respective auxiliary channel 15 is arranged on four distributor channels 60, which guides water 51 to an adjacent main channel 11 or to an adjacent lateral surface 31 and thus connects the respective distributor channel 60 to the main channel 11 or to the lateral surface 31. The auxiliary channels 15 begin at the distributor channels 60.

A first part 17 of each auxiliary channel 15 is arranged at a first angle 19 to the adjacent main channel 11 and a second part 21 of each auxiliary channel 15 is arranged at a second angle 23 to the adjacent main channel 11. The auxiliary channels 15 shown here have a curvilinear path, so that their arrangement changes in terms of the path relative to the neighboring main channel 11. The auxiliary channels 15 are respectively arranged on the distributor channels 60 substantially perpendicular to the main channel 11 and arranged in the main channel 11 or in the vicinity of the main channel 11 substantially parallel to the main channel 11.

A first auxiliary channel 82 terminates on a planar part 62 of the floor surface 33 of the adjacent main channel 11. A second auxiliary channel 84 terminates at an edge 59 between the floor surface 33 of the main channel 11 and the lateral surface 31 of the web 12. A third auxiliary channel 86 terminates on the lateral surface 31 of the web 12 so that water 51 can drain from the lateral surface 31 onto the floor surface 33 of the adjacent main channel 11. Furthermore, a first sectional plane 76 is marked.

Figure 6:
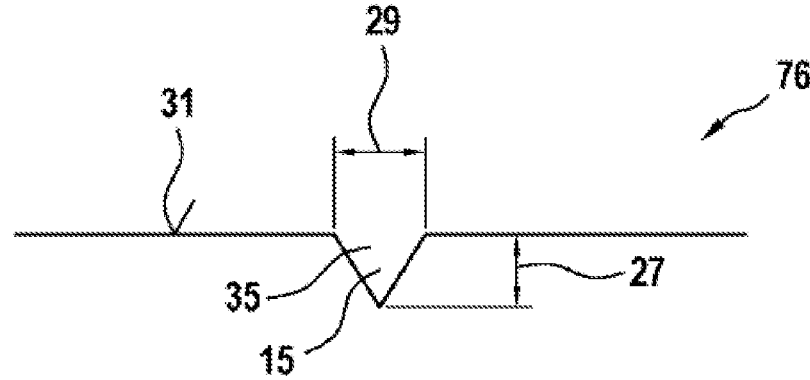

FIG. 6 shows a sectional view along the first sectional plane 76 shown in FIG. 5. The auxiliary channel 15 is arranged in the lateral surface 31 of the web 12 and has a cross-sectional surface area 35 that is V-shaped. The auxiliary channel 15 has a width 29 and a depth 27.

Figure 7:
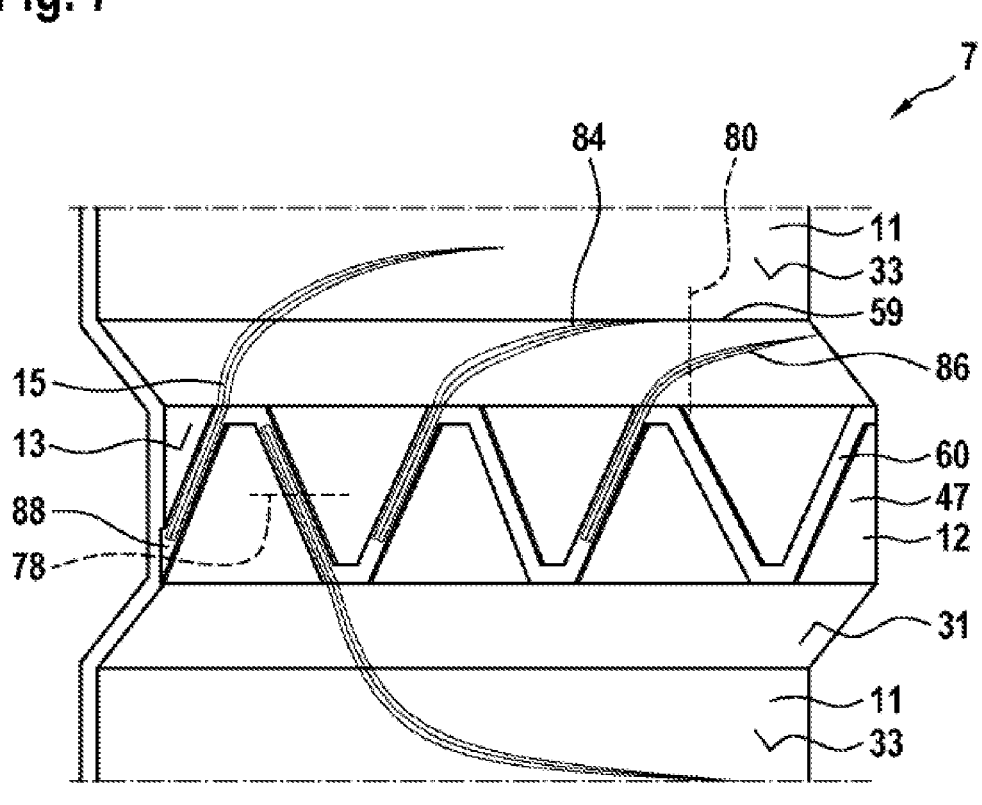

FIG. 7 shows a top perspective view of a section of a distributor plate 7 with auxiliary channels 15 within distributor channels 60. The distributor plate 7 according to FIG. 7 substantially corresponds to the distributor plate 7 according to FIG. 5 with the difference that the auxiliary channels 15 respectively extend partially in the distributor channels 60, wherein the auxiliary channels 15 are arranged in a base 88 of the distributor channels 60. Accordingly, the auxiliary channels 15 are arranged in part in the contact region 47 to a gas diffusion layer 5. Additionally, a second sectional plane 78 and a third sectional plane 80 are marked.

Figure 8:
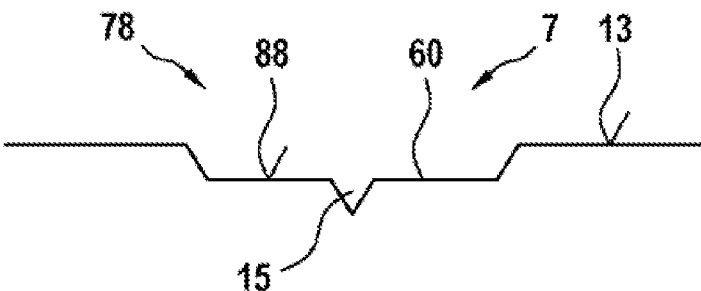

FIG. 8 shows a sectional view along the second sectional plane 78 shown in FIG. 7. Arranged in the surface 13 of the web 12 is the distributor channel 60 and arranged in the floor 88 of the distributor channel 60 is the auxiliary channel 15.

Figure 9:
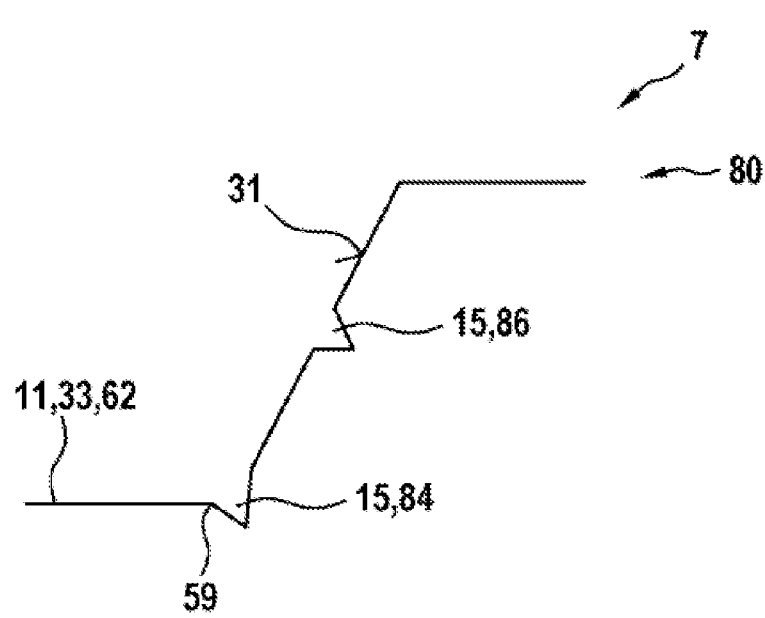

FIG. 9 shows a sectional view along the third sectional plane 80 shown in FIG. 7. The second auxiliary channel 84 is arranged at the edge 59 between the lateral surface 31 and the floor surface 33. The third auxiliary channel 86 is located in the lateral surface 31 of the web 12.

Figure 10:
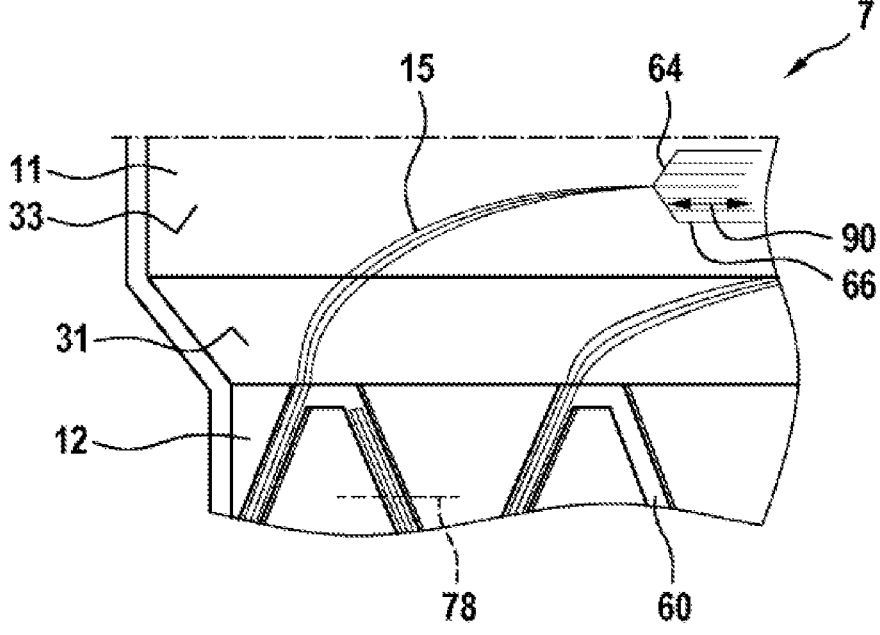

FIG. 10 shows a top perspective view of a section of a distributor plate 7 having an auxiliary channel 15 that opens into an end structure 64 with more than two sub-channels 66. Multiple sub-channels 66 are present, each having a same length 90 but being arranged offset from one another. The end structure 64 is arranged on the floor surface 33 of the main channel 11.

Figure 11:
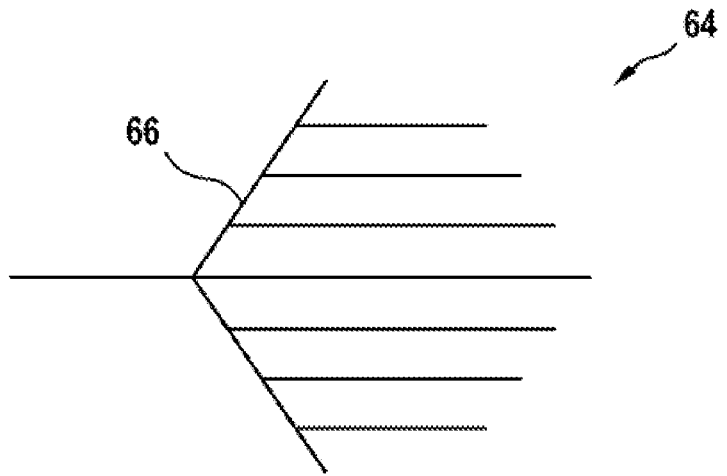

FIG. 11 shows a further embodiment of an end structure 64, wherein the sub-channels 66 in each case have different lengths 90 and the length 90 within the end structure 64 decreases from inward to outward.

Figure 12:
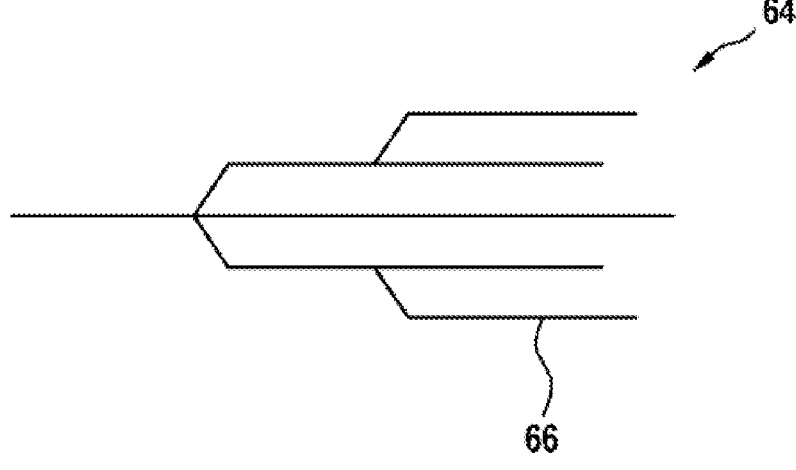

FIG. 12 shows yet another embodiment of an end structure 64 with sub-channels 66, wherein the sub-channels 66 are arranged in groups offset from one another.

Figure 13:
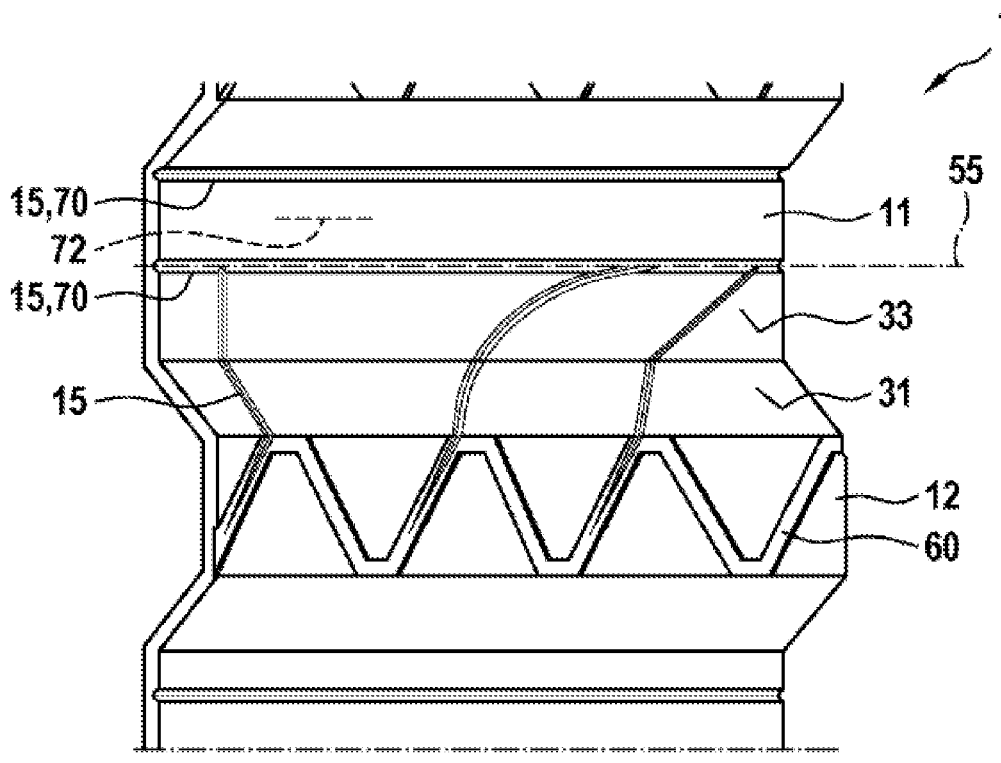

FIG. 13 shows a top perspective view of a section of a distributor plate 7 with distributor channels 60, auxiliary channels 15 and further auxiliary channels 70. The auxiliary channels 15 are partially arranged within the distributor channels 60 and all open up into a further auxiliary channel 70, which is arranged along an axis of symmetry 55 of the main channel 11. The assembly angle 72 of the further auxiliary channels 70 is 0° in the illustrated embodiment, and correspondingly the further auxiliary channels 70 run parallel to the main channel 11. Furthermore, the width 29 and depth 27 of the auxiliary channels 15 in the distributor channels 60 increase in the discharge direction.

Figure 14:
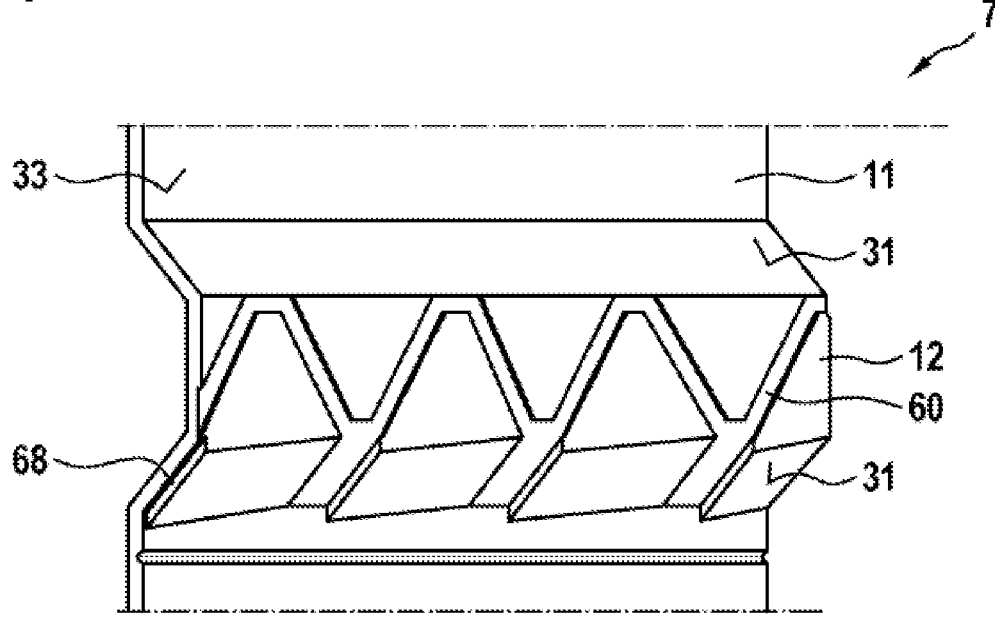

FIG. 14 shows a top perspective view of a section of a distributor plate 7 with blocking edges 68 formed on the lateral surface 31 of the web 12. The other lateral surface 31 of the web 12 can optionally also have at least one blocking edge 68.

Figure 15:
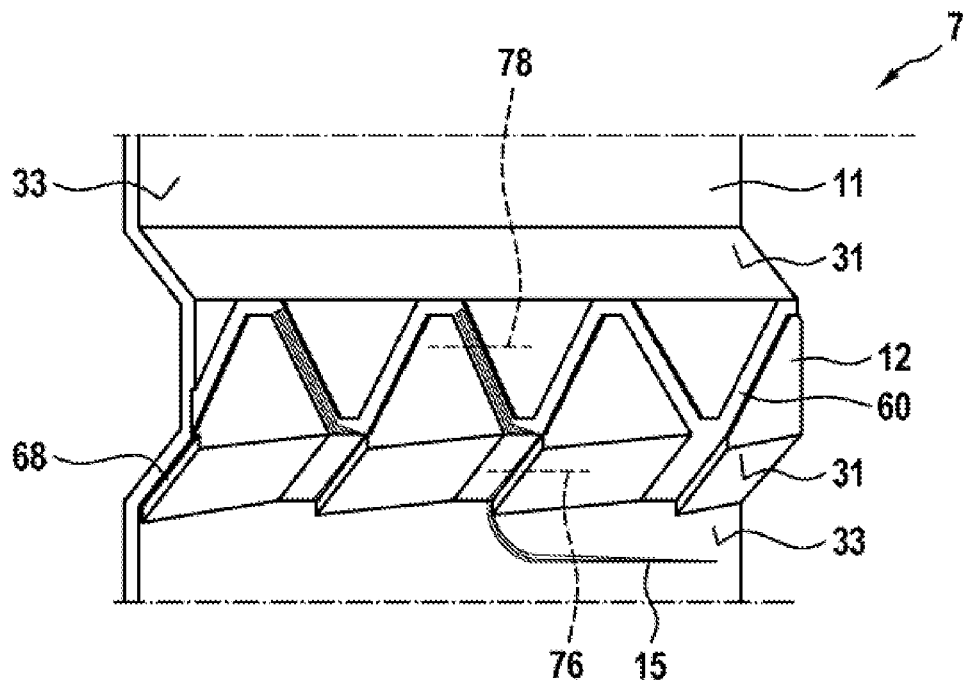

FIG. 15 shows a top perspective view of a section of a distributor plate 7 with blocking edges 68 and auxiliary channels 15 arranged along them.

Figure 16:
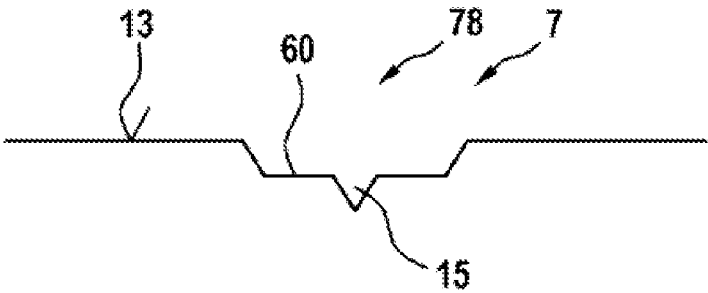

FIG. 16 shows a sectional view along the second sectional plane 76 shown in FIG. 15.

Figure 17:
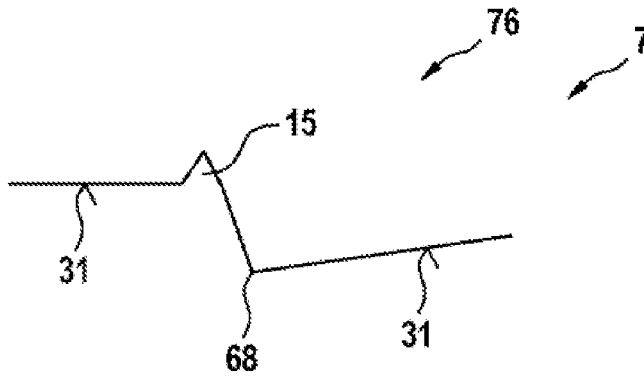

FIG. 17 shows a sectional view along the second sectional plane 76 shown in FIG. 15. The auxiliary channel 15 along the blocking edge 68 on the lateral surface 31 of the web 12 becomes clear.

Figure 18:
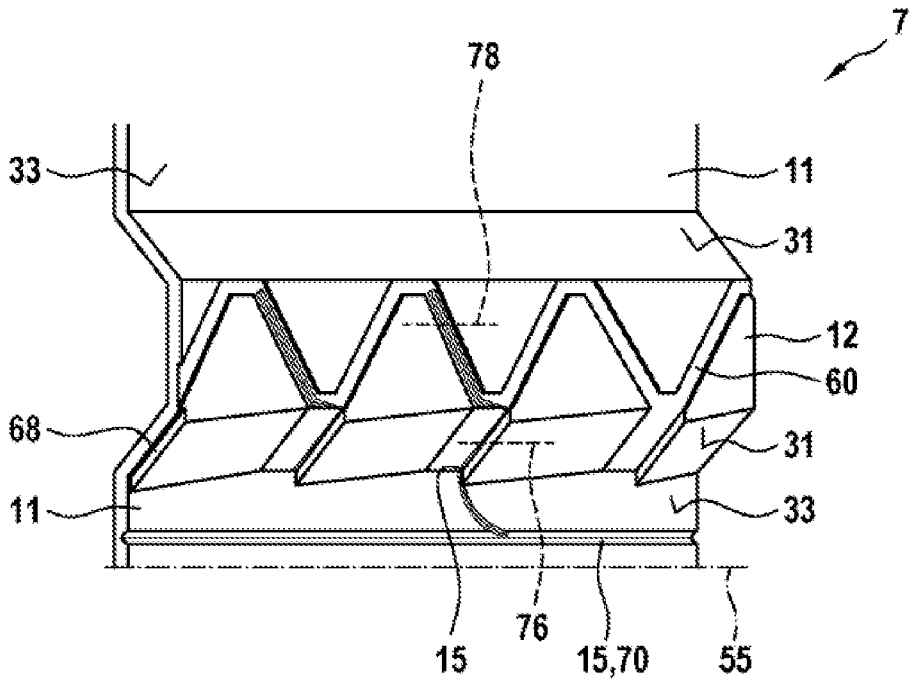

FIG. 18 shows a top perspective view of a section of a distributor plate 7 with distributor channels 60, auxiliary channels 15, blocking edges 68, and a further auxiliary channel 70. An auxiliary channel 15 runs along one of the blocking edges 68 and opens into the further auxiliary channel 70, which runs parallel to an axis of symmetry 55 of the main channel 11.

The invention is not limited to the embodiment examples described here and the aspects highlighted therein. Rather, a variety of modifications, which are within the scope of activities of the person skilled in the art, is possible within the range specified by the claims.

The invention claimed is:

1. A distributor plate (7) for an electrochemical cell (1), wherein the distributor plate (7) has a structure comprising webs (12) with surfaces (13) and main channels (11) having floor surfaces (33), and the surfaces (13) of the webs (12) have distributor channels (60) recessed directly into the surfaces (13), wherein an auxiliary channel (15) extends from at least one distributor channel (60) and connects the at least one distributor channel (60) to a base surface (33) of a main channel (11) and/or a lateral surface (31) of a web (12), and wherein the auxiliary channel (15) has a smaller diameter than the at least one distributor channel (60).

2. The distributor plate (7) according to claim 1, wherein the auxiliary channel (15) terminates on a planar part (62) of the base surface (33) of the main channel (11) or the lateral surface (31) of the web (12) or at an edge (59) between the base surface (33) of the main channel (11) and the lateral surface (31) of the web (12).

3. The distributor plate (7) according to claim 1, wherein the auxiliary channel (15) opens into a further auxiliary channel (15, 70) on the base surface (33) of the main channel (11).

4. The distributor plate (7) according to claim 3, wherein the further auxiliary channel (15, 70) is arranged at an assembly angle (72) of less than 45° to the main channel (11).

5. The distributor plate (7) according to claim 1, wherein the auxiliary channel (15) opens into an end structure (64), wherein the auxiliary channel (15) in the end structure (64) branches into at least two sub-channels (66) and the at least two sub-channels (66) each have a smaller diameter than the auxiliary channel (15).

6. The distributor plate (7) according to claim 1, wherein the auxiliary channel (15) is arranged with a first part (17) at a first angle (19) in a range from 30° to 150° to the main channel (11) and with a second part (21) at a second angle (23) in a range of less than 45° to the main channel (11).

7. The distributor plate (7) according to claim 1, wherein the auxiliary channel (15) has a curved path.

8. The distributor plate (7) according to claim 1, wherein the auxiliary channel (15) extends partially in the at least one distributor channel (60).

9. The distributor plate (7) according to claim 8, wherein the lateral surface (31) comprises at least one blocking edge (68) and the auxiliary channel (15) is arranged at least partially along the at least one blocking edge (68).

10. The distributor plate (7) according to claim 1, wherein a respective width (29) and/or a depth (27) of the auxiliary channel (15) is from 1 μm to 150 μm.

11. The distributor plate (7) according to claim 1, wherein a cross-sectional surface area (35) of the auxiliary channel (15) is V-shaped.

12. The distributor plate (7) according to claim 1, wherein the distributor plate (7) at least partially comprises a coating (37), which comprises an inner structure (74).

13. The distributor plate (7) of claim 12, wherein the auxiliary channel (15) is introduced into the coating (37).

14. An electrochemical cell (1) comprising a distributor plate (7) according to claim 1.

* * * * *